United States Patent
Li et al.

(10) Patent No.: US 10,097,420 B2
(45) Date of Patent: Oct. 9, 2018

(54) METHOD AND APPARATUS FOR DETERMINING AREA IN WHICH IP ADDRESS IS LOCATED

(71) Applicant: Tencent Technology (Shenzhen) Company Limited, Shenzhen (CN)

(72) Inventors: Yuhuang Li, Shenzhen (CN); Peng He, Shenzhen (CN); Yong Hu, Shenzhen (CN); Chuan Chen, Shenzhen (CN); Jing Nie, Shenzhen (CN); Yu Liang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 465 days.

(21) Appl. No.: 14/879,950

(22) Filed: Oct. 9, 2015

(65) Prior Publication Data

US 2016/0036646 A1    Feb. 4, 2016

Related U.S. Application Data

(63) Continuation of application No. PCT/CN2013/090336, filed on Dec. 24, 2013.

(30) Foreign Application Priority Data

Apr. 10, 2013 (CN) ............... 2013 1 0122524

(51) Int. Cl.
*G06F 15/16*    (2006.01)
*H04L 12/24*    (2006.01)
(Continued)

(52) U.S. Cl.
CPC ............ *H04L 41/14* (2013.01); *G01S 5/0278* (2013.01); *H04L 67/18* (2013.01); *H04L 67/303* (2013.01);
(Continued)

(58) Field of Classification Search
CPC ... G06Q 10/00; G06F 17/3087; H04W 4/029; H04W 8/18; H04W 4/021; H04W 4/12;
(Continued)

(56) References Cited

U.S. PATENT DOCUMENTS

2003/0036949 A1    2/2003  Kaddoche et al.
2009/0019182 A1*   1/2009  Riise ............... G06Q 10/00
                                                    709/245

(Continued)

FOREIGN PATENT DOCUMENTS

CN    101355595 A1    1/2009
CN    103220376 A     7/2013
(Continued)

OTHER PUBLICATIONS

Tencent Technology, ISR, PCT/CN2013/090336, dated Mar. 27, 2014, 3 pgs.
(Continued)

*Primary Examiner* — Jungwon Chang
(74) *Attorney, Agent, or Firm* — Morgan, Lewis & Bockius LLP (57) ABSTRACT

Embodiments of the present application disclose a method and an apparatus for determining a geographical area in which an IP address is located, the method including: acquiring a set of accounts of an application server to which one or more positioning terminals log in during a predetermined time period, wherein the account set is associated with a target IP address; determining a position of a respective positioning terminal corresponding to each account in the account set; collecting statistics for calculation according to the determined positions of the one or more positioning terminals to determine a geographical area in which each positioning terminal is located; and obtaining, according to the area in which each positioning terminal is located, a
(Continued)

geographical area in which the target IP address is located. By using the present application, a geographical area with high precision to which an IP address belongs may be determined as needed.

15 Claims, 5 Drawing Sheets

(51) Int. Cl.
*H04L 29/08* (2006.01)
*G01S 5/02* (2010.01)
*H04W 4/021* (2018.01)
*H04W 4/02* (2018.01)
*H04W 4/029* (2018.01)
*H04L 12/58* (2006.01)
*H04W 4/12* (2009.01)
*H04W 88/16* (2009.01)
*H04W 88/02* (2009.01)
*H04W 64/00* (2009.01)
*H04L 29/12* (2006.01)

(52) U.S. Cl.
CPC ............ *H04W 4/021* (2013.01); *H04L 51/20* (2013.01); *H04L 51/38* (2013.01); *H04L 61/609* (2013.01); *H04W 4/02* (2013.01); *H04W 4/029* (2018.02); *H04W 4/12* (2013.01); *H04W 64/00* (2013.01); *H04W 88/02* (2013.01); *H04W 88/16* (2013.01)

(58) Field of Classification Search
CPC ....... H04W 4/02; H04W 88/16; H04W 88/02; H04W 64/00; H04L 41/0618; H04L 41/14; H04L 67/18; H04L 67/303; H04L 61/609; H04L 51/38; H04L 51/20; G01S 19/14; G01S 19/42; G06S 5/0278

USPC ........ 709/245, 224; 455/456.2, 456.6, 456.1, 455/414.1; 707/724

See application file for complete search history.

(56) References Cited

U.S. PATENT DOCUMENTS

| | | | | |
|---|---|---|---|---|
| 2010/0041378 | A1* | 2/2010 | Aceves | ................... H04W 8/18 455/414.1 |
| 2010/0197318 | A1* | 8/2010 | Petersen | ............... H04W 4/029 455/456.1 |
| 2012/0058782 | A1* | 3/2012 | Li | ........................... G01S 19/14 455/456.2 |
| 2013/0079039 | A1* | 3/2013 | Heikkilae | ............. H04W 4/025 455/456.6 |
| 2015/0169596 | A1* | 6/2015 | Sidorska | ............. G06F 17/3087 707/724 |
| 2016/0006628 | A1* | 1/2016 | Herring | ............... H04L 41/0618 709/224 |

FOREIGN PATENT DOCUMENTS

| | | |
|---|---|---|
| CN | 103248723 A | 8/2013 |
| EP | 2541838 A | 1/2013 |
| KR | 1079449 B1 | 4/2011 |

OTHER PUBLICATIONS

Tencent Technology, Written Opinion, PCT/CN2013/090336, dated Mar. 27, 2014, 9 pgs.

Tencent Technology, IPRP, PCT/CN2013/090336, dated Oct. 13, 2015, 10 pgs.

* cited by examiner

METHOD AND APPARATUS FOR DETERMINING AREA IN WHICH IP ADDRESS IS LOCATED

RELATED APPLICATIONS

This application is a continuation application of PCT Patent Application No. PCT/CN2013/090336, entitled "METHOD AND APPARATUS FOR DETERMINING AREA IN WHICH IP ADDRESS IS LOCATED" filed on Dec. 24, 2013, which claims priority to Chinese Patent Application No. 201310122524.3, filed with the Chinese Patent Office on Apr. 10, 2013, and entitled "METHOD AND APPARATUS FOR DETERMINING AREA IN WHICH IP ADDRESS IS LOCATED", both of which are incorporated herein by reference in their entirety.

FIELD OF THE TECHNOLOGY

The present application relates to the field of computer technologies, and in particular, to method and an apparatus for determining a geographical area in which an IP address is located.

BACKGROUND OF THE DISCLOSURE

An IP address refers to an address that is allocated for each host connected to the Internet, and a user may communicate with another host in the Internet by using a host and an IP address. After a host allocated with an IP address logs in to an application server, the application server may further determine, according to a mapping relationship between an IP address and an administrative division, a city in which a user is located, and then push message content such as weather forecast, discount of a shopping mall, and entertainment and playing information of the city to the user according to a deployed pushing policy.

An existing area in which an IP address is located can be accurate only to a located city, and cannot be further subdivided into a district/county level, so that the existing area in which an IP address is located cannot be subdivided into a geographical area with corresponding precision flexibly according to a specific precision requirement.

SUMMARY

Embodiments of the present application provide a method and an apparatus for determining a geographical area in which an IP address is located, to solve the foregoing problem.

An embodiment of the present application provides a method performed by a computer for determining a geographical area in which an IP address is located, including:

acquiring an account set of accounts of an application server to which one or more positioning terminals log in during a predetermined time period, wherein the account set is associated with a target IP address;

determining a position of a respective positioning terminal corresponding to each account in the account set;

collecting statistics for calculation according to the determined positions of the one or more positioning terminals to determine a geographical area in which each positioning terminal is located; and obtaining, according to the area in which each positioning terminal is located, a geographical area in which the target IP address is located.

Correspondingly, an embodiment of the present application further provides a computer system for determining a geographical area in which an IP address is located. The computer system includes one or more processors, memory, and a plurality of program modules stored in the memory and to be executed by the one or more processors, wherein the plurality of program modules further include:

an acquisition module, configured to acquire an account set of accounts of an application server to which one or more positioning terminals log in during a predetermined time period, wherein the account set is associated with a target IP address;

a determining module, configured to determine a position of a respective positioning terminal corresponding to each account in the account set; and a processing module, configured to collect statistics for calculation according to the determined positions of the one or more positioning terminals to determine a geographical area in which each positioning terminal is located, and obtain, according to the area in which each positioning terminal is located, a geographical area in which the target IP address is located.

In addition, an embodiment of the present application further provides a non-transitory computer readable storage medium storing a plurality of computer executable instructions which, when executed by a computer system having one or more processors, cause the one or more processors to perform the following steps:

acquiring an account set of accounts of an application server to which one or more positioning terminals log in during a predetermined time period, wherein the account set is associated with a target IP address;

determining a position of a respective positioning terminal corresponding to each account in the account set;

collecting statistics for calculation according to the determined positions of the one or more positioning terminals to determine a geographical area in which each positioning terminal is located; and obtaining, according to the area in which each positioning terminal is located, a geographical area in which the target IP address is located.

In the embodiments of the present application, a geographical area in which an IP address is located can be determined according to a user account using the IP address, and a position of a positioning terminal used when the user account logs in; and the area to which the IP address belongs may be obtained according to a precision requirement of a user, thereby facilitating, according to the IP address, when an application such as message pushing is executed subsequently, pushing more precise information about a geographical area in which the user is located for the user.

DESCRIPTION OF EMBODIMENTS

The following describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

Figure 1:
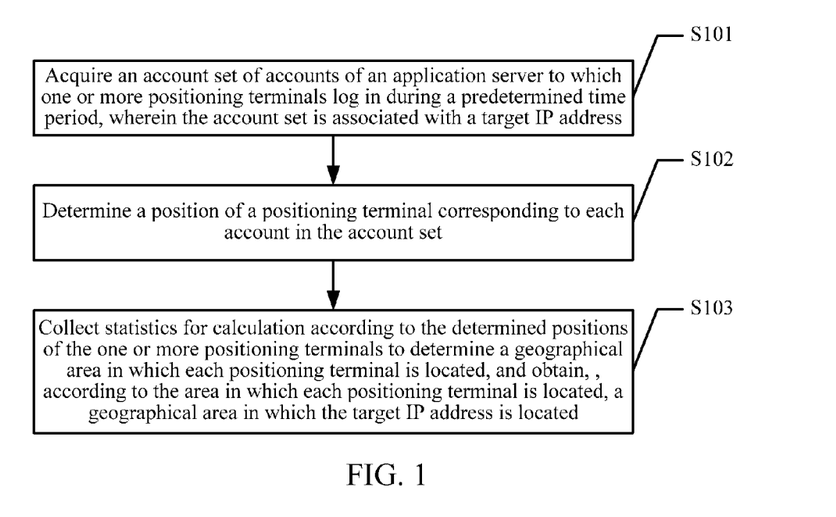
FIG. 1 is a schematic flowchart of a method for determining a geographical area in which an IP address is located of an embodiment of the present application.

FIG. 1 is a schematic flowchart of a method for determining a geographical area in which an IP address is located of an embodiment of the present application. The method of this embodiment of the present application is applicable to a server recording a geographical area in which an IP address is located, so as to determine a more precise area in which an IP address is located, to execute another application. The method includes step S101 to step S103.

S101: Acquire an account set of accounts of an application server to which one or more positioning terminals log in during a predetermined time period, and the account set is associated with a target IP address.

The target IP address is any IP address needing to determine a geographical area to which it belongs. Because in a normal case, only one user terminal is allocated with the target IP address, all user terminals using the target IP address within a certain time range need to be acquired, and a specific area in which the target IP address is located is determined according to positions of these user terminals.

In this embodiment, the accounts using the target IP address to log in to an application server(s) may be extracted from one or more application servers, to constitute the account set. Based on an existing Internet communication manner, a user inputs an account into a personal computer to log in to an application server such as an instant messaging server and a microblog server, and the corresponding application server can record the user account logging in for this time and an IP address used by the personal computer. Therefore, in the application server such as the instant messaging application server and the microblog application server, the corresponding user accounts within the certain time range can be acquired based on the target IP address, to constitute the account set.

The account set may include: all accounts using the target IP address accounts; or include accounts using the target IP address and logging in at multiple points, that is, accounts that log in, during a process of using the target IP address to log in to an application server, to the application server further by using another positioning terminal. In existing application servers of various types, multiple points of presence may be implemented generally, that is, one account may log in on a personal computer, and a smart handheld terminal (a terminal such as a smart phone and a tablet computer) at the same time. An account set composed of only accounts using the target IP address and logging in at multiple points may be acquired in S101.

S102: Determine a position of a respective positioning terminal corresponding to each account in the account set.

In this embodiment, the positioning terminal may be a terminal such as a smart phone and a tablet computer, which can position a position of the terminal. After a user account logs in to an application server at multiple points, the application server can acquire the position of the positioning terminal from another server configured to position the positioning terminal, or may also trigger a positioning module such as the Global Positioning System (GPS) in the positioning terminal to acquire and update the position of the positioning terminal. The application server may record an IP address, the account, and the corresponding position of the positioning terminal, so as to find the account based on an IP and obtain the corresponding position of the positioning terminal, where the position of the positioning terminal may be information such as one or more latitude and longitude coordinates and a coordinate track, which represents a position.

S103: Collect statistics for calculation according to the determined positions of the one or more positioning terminals to determine a geographical area in which each positioning terminal is located, and obtain, according to the area in which each positioning terminal is located, a geographical area in which the target IP address is located.

S103 may include: first, calculating, when the account is logged into at multiple points by using a positioning terminal such as a personal computer and a mobile terminal, a probability that the personal computer and the mobile terminal are located in the same area at the same time, where the probability that the personal computer and the mobile terminal are located in the same area at the same time may be calculated by using Bayes' rule; and then determining, according to a probability value, the area in which the target IP address is located when each account logs in, determining an appearance frequency of the initial graphical area of each account using the target IP address, and choosing an initial geographical area of an account that has the highest appearance frequency as the geographical area in which the target IP address is located. At this time, the area in which the positioning terminal is located may be determined flexibly according to a precision requirement for the area to which the IP address belongs. A city level, a district or county level, or even a street level area in which the position is located is determined specifically according to the position of the positioning terminal and an electronic map database, to satisfy the precision requirement.

In addition, in S102, during a process in which each account in the account set uses the target IP address to log in to the application server, a corresponding position of a login terminal is a position of a personal computer using the target IP address, that is, after each account logs in, the corresponding application server can trigger to acquire the position of the corresponding personal computer. For example, after the account logs in, the application server acquires the position of the personal computer, and then, in S103, according to the number of times that the position in which the personal computer corresponding to each account in the account set is located appears, a geographical area corresponding to a position appearing most frequently is determined as the area in which the target IP address is located. If the position is a district or county level or even a street level administrative area, the district or county level or even the street level administrative area may be directly used as the area in which the target IP address is located; or if the position is the latitude and longitude coordinates or the coordinate track, the latitude and longitude coordinates and the coordinate track is first combined with the electronic map database, to obtain a district or county level or even a street level administrative area, and then the district or county level or even the street level administrative area is used as the area in which the target IP address is located. At this time, according to a precision requirement of a user, if the user needs district or county level area precision, then the district or county level administrative area in which the latitude and longitude coordinates and the coordinate track are located may be determined according to the electronic map database; or if a street level is needed, the street level administrative area in which the latitude and longitude coordinates and the coordinate track are located may be determined according to the electronic map database.

After obtaining the area in which the target IP address is located, the area in which the target IP address area is located may further be recorded or updated, so as to execute another application such as accurate message pushing subsequently.

In this embodiment of the present application, a geographical area in which an IP address is located can be determined according to a user account using the IP address, and a position of a positioning terminal used when the user account logs in, and because the position of the positioning terminal may correspond to a city level, a district or county level, or a street level area, or the like, the area to which the IP address belongs may be obtained according to a precision requirement of a user, to satisfy a precision requirement of positioning an IP address, thereby facilitating, according to the IP address, when an application such as message pushing is executed subsequently, pushing more precise information about a geographical area in which the user is located for the user.

Figure 2:
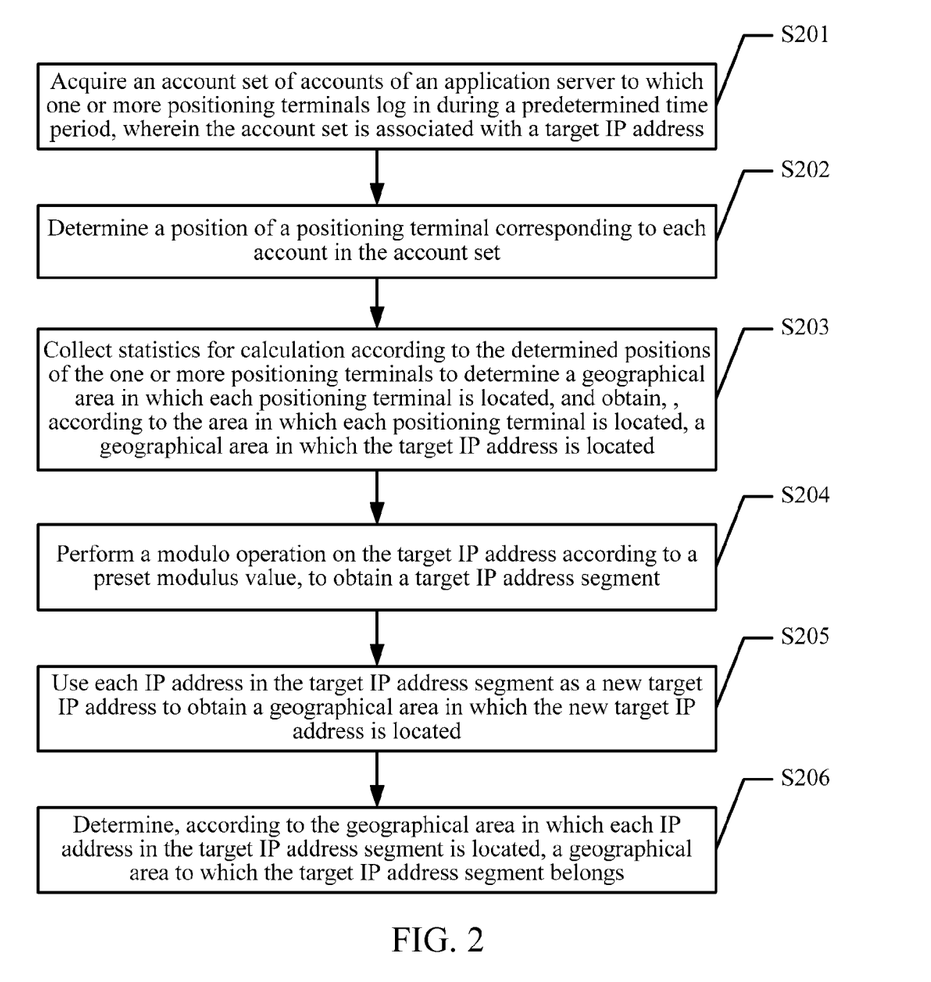
FIG. 2 is a schematic flowchart of another method for determining a geographical area in which an IP address is located of an embodiment of the present application.

FIG. 2 is a schematic flowchart of another method for determining a geographical area in which an IP address is located of an embodiment of the present application. The method of this embodiment of the present application is applicable to a remote server recording a geographical area in which an IP address is located, so that a more precise IP address or a geographical area to which a corresponding IP address segment belongs can be determined when needed, to execute another application. The method includes step S201 to step S206.

S201: Acquire an account set of accounts of an application server to which one or more positioning terminals log in during a predetermined time period, and the account set is associated with a target IP address.

S202: Determine a position of a respective positioning terminal corresponding to each account in the account set.

S203: Collect statistics for calculation according to the determined positions of the one or more positioning terminals to determine a geographical area in which each positioning terminal is located, and obtain, according to the area in which each positioning terminal is located, a geographical area in which the target IP address is located.

For specific implementation manners of S201 to S203, reference may be made to S101 to S103 in the first embodiment, and details are not described herein.

S204: Perform a modulo operation on the target IP address according to a preset modulus value, to obtain a target IP address segment. For example, a modulo 256 operation may be performed on the target IP address, to obtain the target IP address segment corresponding to the target IP address, and therefore, there are 256 IP addresses in the target IP address segment.

S205: Use each IP address in the target IP address segment as a new target IP address to obtain a geographical area in which the new target IP address is located.

That is, each IP address in the target IP address segment is sequentially used as a new target IP address, and S201 to S203 are re-executed, to obtain the area in which each IP address in the target IP address segment is located. That is, in this embodiment of the present application, the target IP address segment may obtain up to 256 areas.

S206: Determine, according to the geographical area in which each IP address in the target IP address segment is located, a geographical area to which the target IP address segment belongs.

In this embodiment, the area in which the target IP address segment is located may be roughly obtained according to a frequency in which the area corresponding to each IP address in the target IP address segment appears.

Alternatively, a proportion pou of covered users and a proportion poi of IP addresses in the areas may be calculated further according to the area in which each IP address in the target IP address segment is located, thereby determining the area in which the target IP address segment is located. Poi=a quantity of IP addresses covered in the corresponding area/256, and pou=a quantity of login accounts of the IP addresses covered in the corresponding area/a total quantity of login accounts of the target IP address segment. Then, a degree of polymerization of the target IP address segment= (poi+pou)/2 is calculated, information about a geographical area having a highest degree of polymerization is the area in which the target IP address segment is finally located.

For example, for a target IP address segment of 121.14.96.*, after each IP address is used as a target IP address to execute S201 to S203, a geographical area corresponding to a district or county level or even a street level area is obtained as needed, and there are 256 areas in total. It is assumed that 200 areas are Nanshan district of Shenzhen city, poi of the Nanshan district of Shenzhen city=200/256; and under 200 IP addresses covered by the Nanshan district, 1000 users log in every day, that is, 1000 accounts using IP addresses in the target IP address segment of 121.14.96.* successively log in to the application server every day, while every day, a total quantity of users logging in on 121.14.96.* is 1200, so that it can be obtained that pou of the Nanshan district=1000/1200. In summary, a degree of polymerization of the Nanshan district=(poi+pou)/2=(200/256+1000/1200)/2=0.85, and is the highest degree of polymerization in all the areas, so that the Nanshan district of Shenzhen city in Guangdong province is final geographical information of the target IP address segment.

Further, after the area in which the target IP address is located and an IP address library is updated by using the area in which the target IP address segment is located, the method may further include: updating the IP address library according to the area in which the target IP address is located and the area in which the target IP address segment is located, so as to determine a position of an IP address according to the updated IP address library. After the update, the new area in which the target IP address is located and the new area in which the target IP address segment is located may be provided for a server such as a message pushing server, so as to facilitating performing a better massage pushing service.

In this embodiment of the present application, according to a user account using an IP address, and a position of a positioning terminal used when the user account logs in, a geographical area in which an IP address is located can be determined and a geographical area to which an IP address segment corresponding to the IP address belongs may also be obtained. Because the position of the positioning terminal may correspond to a city level, a district or county level, or a street level area, or the like, the area to which the IP address belongs may be obtained according to a precision requirement of a user, to satisfy a precision requirement of positioning an IP address, thereby facilitating, according to the IP address, when an application such as message pushing is executed subsequently, pushing more precise information about a geographical area in which the user is located for the user.

Figure 3:
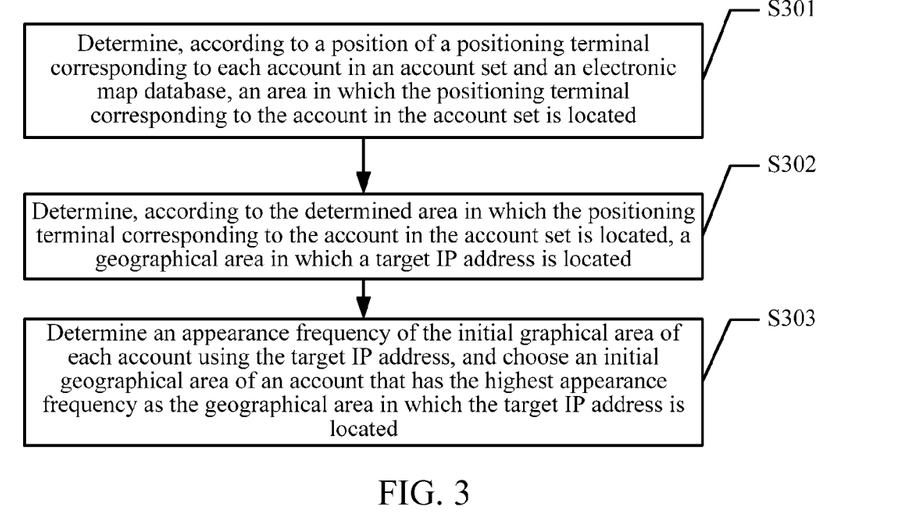
FIG. 3 is a schematic flowchart of the method for determining a geographical area in which a target IP address is located of an embodiment of the present application.

FIG. 3 is a schematic flowchart of the method for determining a geographical area in which a target IP address is located of an embodiment of the present application. The method described in this embodiment of the present application may correspond to S103 in the corresponding embodiment of FIG. 1 or S203 in the corresponding embodiment of FIG. 2. This embodiment of the present application uses that a login terminal on which a user account logs in is only a personal computer for description. The method described in this embodiment of the present application specifically includes step S301 to step S303.

S301: Determine, according to the position of the positioning terminal corresponding to each account in the account set and an electronic map database, a geographical area in which the positioning terminal corresponding to the account in the account set is located.

That is, a position in which latitude and longitude coordinates, a coordinate track, and the like of a personal computer are located is determined according to the electronic map database, to obtain a district or county level administrative area, a street level administrative area, or the like in which a login terminal corresponding to each account is located.

S302: Determine, according to the determined area in which the positioning terminal corresponding to the account in the account set is located, a geographical area in which the target IP address is located.

S303: Determine an appearance frequency of the initial graphical area of each account using the target IP address, and choose an initial geographical area of an account that has the highest appearance frequency as the geographical area in which the target IP address is located.

Because the personal computer of a user may move, for example, a personal computer of a user may move when a notebook computer is used or the personal computer is in a mobile object such as a vehicle, the determined area in which the target IP address is located may be two or more areas. However, most personal computers cannot move generally, and therefore, the appearance frequency of each area of the target IP address is determined, and the area having a greatest appearance frequency is used as the area in which the target IP address is located. The appearance frequency of each area of the target IP address is the number of times that or a frequency in which the target IP address appears for each area.

In this embodiment of the present application, a relatively accurate area in which an IP address is located can be determined according to a user account using the IP address and a position of a personal computer used when the user account logs in.

Figure 4:
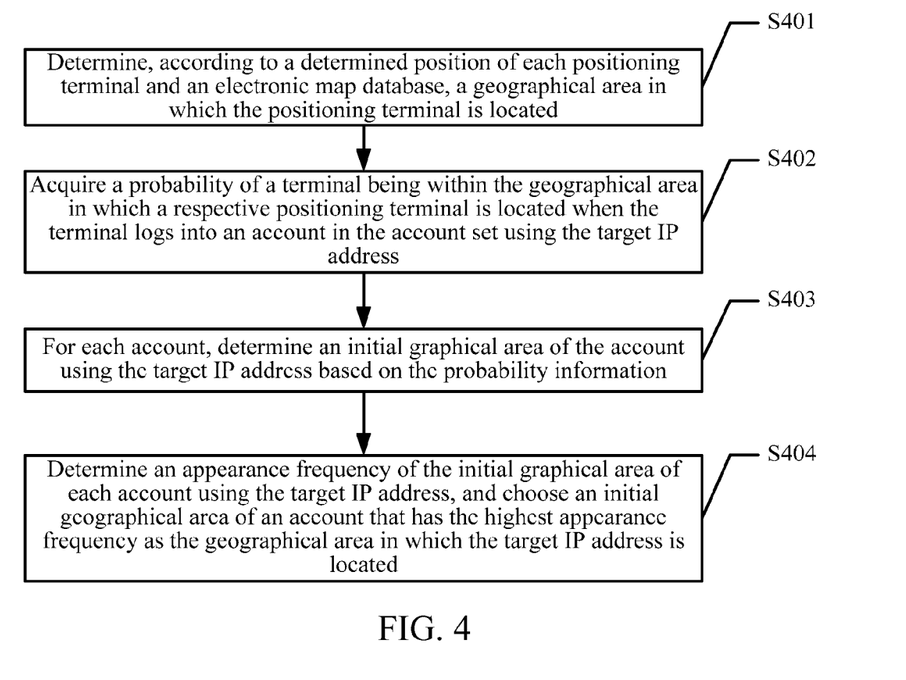
FIG. 4 is a schematic flowchart of another method for determining a geographical area in which a target IP address is located of an embodiment of the present application.

FIG. 4 is a schematic flowchart of another method for determining a geographical area in which a target IP address is located of an embodiment of the present application. The method described in this embodiment of the present application may correspond to S103 in the corresponding embodiment of FIG. 1 or S203 in the corresponding embodiment of FIG. 2. This embodiment of the present application uses that a login terminal on which a user account logs in includes a positioning terminal such as a mobile terminal logging in at multiple points, and a personal computer as an example for description. The determining a geographical area in which the target IP address is located in the method described in this embodiment of the present application is obtained according to a geographical area of a position in which the positioning terminal such as the mobile terminal is located, and the method includes step S401 to step S404.

S401: Determine, according to the determined position of each positioning terminal and an electronic map database, a geographical area in which the positioning terminal is located.

That is, a position in which latitude and longitude coordinates, a coordinate track, and the like of a mobile terminal are located is determined according to the electronic map database, to obtain a city level or a district or county level administrative area, a street level administrative area, or the like in which the positioning terminal corresponding to each account is located, for example, when there are 100 accounts in the account set, 100 positions may be obtained in S401.

S402: Acquire a probability of a terminal being within the geographical area in which a respective positioning terminal is located when the terminal logs into an account in the account set using the target IP address.

Because the mobile terminal is movable, a geographical area in which the mobile terminal area is located may be not a geographical area in which a personal computer allocated with the target IP address is located. At this time, a probability that when each account in the account set logs in, the area in which the terminal using the target IP address is located is the same as the area in which the mobile terminal area is located may be calculated based on Bayes' rule. A greater probability value indicates a greater probability that the personal computer allocated with the target IP address and the mobile terminal have the same position, and a position, corresponding to a greatest probability value, of the mobile terminal may be used as the position of the personal computer allocated with the target IP address, so as to determine the area in which the target IP address is located.

A calculation manner of S402 may include: determining a time duration of the positioning terminal corresponding to the account is in the geographical area; acquiring a login time duration of the account at the application server using the positioning terminal and a login time duration of the account at the application server using the terminal and the target IP address; and calculating, according to the duration that the positioning terminal corresponding to each account is in the target area, the duration that each account logs in to the application server by using the corresponding positioning terminal, and the duration that each account logs in to the application server by using the target IP address, and based on Bayes' rule, the probability that when each account in the account set logs in, the terminal using the target IP address is located in the area in which the corresponding positioning terminal is located.

Specifically, Bayes' formula is as follows:

$$P(A|B)=P(B|A)*P(A)/P(B);$$

A and B refer to events; A|B refers to a probability that A occurs then while B occurs; and B|A has an opposite meaning. In Bayes' model of this embodiment of the present application, B refers to determining, according to the obtained position of the positioning terminal of each time, that a user U is located in a geographical area L in a specific time period T; and A refers to that the personal computer of the user U is in the area L within a specific time period T1, where T1 includes T. The area obtained according to the position may include multiple areas. In this embodiment of the present application, a probability that when the positioning terminal appears in a geographical area L, the personal computer, that is, the IP address, may also be in the area L is calculated, and then a geographical area having a greatest probability value is used as a matching area of the personal computer, that is, the IP address.

Because T1 includes T, $P(B|A)=1$, and therefore $P(A|B) = P(A)/P(B)$.

It needs to solve only $P(A)$ and $P(B)$. By using data of the position of the positioning terminal of each time, it may be obtained that $P(B)$=a time for which the user appears in the area L/a total duration of a user track; and $P(A)$=a duration that the user appears in the area L/an online duration of a login account on the personal computer of the user. An acquisition manner of the online duration that the user logs in to the account on the personal computer may be: obtained from a login log in an application server after the account of the user logs in by using the personal computer. Because the duration that the user appears in the area L cannot be obtained directly, and needs to be calculated indirectly, it may be known from the above assumption that: T1 includes T, and if the account is always in a login state in the personal computer within T1, it may be known that the user is in the area L within T1, and the duration that the positioning terminal appears in the area L is obtained by using this indirect association method. This duration is obtained through estimation, and is usually less than an actual duration of the user in the area L. A balance coefficient 1.67 is used herein, so that $P(A|B)=1.67*P(A)/P(B)$. By using Bayes' rule, the probability that A: the personal computer, that is, the IP address appears then while B: the positioning terminal appears in the area L may be obtained by calculation, and the corresponding area L is determined according to the size of a probability value obtained by calculation, so as to obtain a matching relationship between the personal computer, that is the IP address, and the area L. A result of $P(A|B)$ is a confidence, that is, a value of $P(A|B)$ obtained by calculation is less than a certain value, for example, a position that corresponds to an IP address corresponding to 20% is not used as the position that corresponds to the target IP address when the account of the user logs in.

S403: For each account in the account set, determine a geographical area corresponding to the position of a positioning terminal associated with a maximum probability as an initial graphical area of the account using the target IP address.

S404: Determine an appearance frequency of the initial graphical area of each account using the target IP address, and choose an initial geographical area of an account that has the highest appearance frequency as the geographical area in which the target IP address is located.

For example: after positions and areas corresponding to the foregoing 100 accounts are determined, "Yuexiu district of Guangzhou city in Guangdong province" in which the positioning terminal and the personal computer using the target IP address do not belong to a same area is removed through S402, to obtain positions, that is, areas, which correspond to 95 accounts. For the areas corresponding to the 95 accounts, it is determined that the number of times of areas in which the target IP address is located is distributed as Table 1 below.

TABLE 1

| Information about initial geographical areas (a district or county level) | The number of times | Frequency |
| --- | --- | --- |
| Nanshan district of Shenzhen city in Guangdong province | 75 | 79% |
| Futian district of Shenzhen city in Guangdong province | 6 | 6% |
| Baoan district of Shenzhen city in Guangdong province | 9 | 9% |
| Yuen Long district of Hong Kong | 5 | 5% |

It may be determined from Table 1 that the area in which the target IP address is located may be basically determined as the Nanshan district of Shenzhen city in Guangdong province.

In this embodiment of the present application, a relatively accurate area in which an IP address is located can be determined according to a user account using the IP address and a position of a positioning terminal used when the user account logs in.

A computer system for determining a geographical area in which an IP address is located of an embodiment of the present application is described below in detail.

Figure 5:
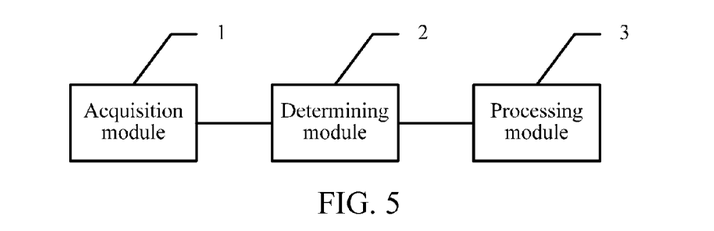
FIG. 5 is a schematic structural diagram of a computer system for determining a geographical area in which an IP address is located of an embodiment of the present application.

FIG. 5 is a schematic structural diagram of a computer system for determining a geographical area in which an IP address is located of an embodiment of the present application. The computer system described in this embodiment of the present application may be disposed in a server configured to record a geographical area in which an IP address is located, so that a more precise area in which an IP address is located can be determined when needed, to execute another application. The computer system includes an acquisition module 1, a determining module 2, and a processing module 3.

The acquisition module 1 is configured to acquire an account set of accounts of an application server to which one or more positioning terminals log in during a predetermined time period, and the account set is associated with a target IP address.

The determining module 2 is configured to determine a position of a respective positioning terminal corresponding to each account in the account set.

The processing module 3 is configured to collect statistics for calculation according to the determined positions of the one or more positioning terminals to determine a geographical area in which each positioning terminal is located, and obtain, according to the area in which each positioning terminal is located, a geographical area in which the target IP address is located.

The target IP address is any IP address needing to determine a geographical area to which it belongs. Because in a normal case, only one user terminal is allocated with the target IP address, the acquisition module 1 needs to acquire all user terminals using the target IP address within a certain time range, and determine, according to positions of these user terminals, a specific area in which the target IP address is located.

In this embodiment, the acquisition module 1 may extract the accounts that use the target IP address to log in to an application server(s) from one or more application servers, to constitute the account set. Based on an existing Internet communication manner, a user inputs an account into a personal computer to log in to an application server such as an instant messaging server and a microblog server, and the corresponding application server can record the user account logging in for this time and an IP address used by the personal computer. Therefore, in the application server such as the instant messaging application server and the microblog application server, the corresponding user accounts within the certain time range can be acquired based on the target IP address, to constitute the account set.

The account set may include: all accounts using the target IP address accounts; or include accounts using the target IP address and logging in at multiple points, that is, accounts that log in, during a process of using the target IP address to log in to an application server, to the application server further by using another positioning terminal. In existing application servers of various types, multiple points of presence may be implemented generally, that is, one account may log in on a personal computer, and a smart handheld terminal (a terminal such as a smart phone and a tablet computer) at the same time, and therefore, the acquisition module 1 may acquire an account set composed of only accounts using the target IP address and logging in at multiple points.

In this embodiment, the positioning terminal may be a terminal such as a smart phone and a tablet computer, which can position a position of the terminal. After a user account logs in to an application server at multiple points, the application server can acquire the position of the positioning terminal from another server configured to position the positioning terminal, or may also trigger a positioning module such as the GPS in the positioning terminal to acquire and update the position of the positioning terminal. The application server may record an IP address, the account, and the corresponding position of the positioning terminal, so as to find the account based on an IP and obtain the corresponding position of the positioning terminal, where the position of the positioning terminal may be information such as one or more latitude and longitude coordinates and a coordinate track, which represents a position.

The processing module 3 may be configured to: first, calculate, when the account is logged into at multiple points by using a positioning terminal such as a personal computer and a mobile terminal, a probability that the personal computer and the mobile terminal are located in the same area at the same time, where the probability that the personal computer and the mobile terminal are located in the same area at the same time may be calculated by using Bayes' rule; and then determine, according to a probability value, the area in which the target IP address is located when each account logs in, collect statistics about an appearance frequency of each area of the target IP address, and use a geographical area that corresponds to an appearance frequency having a maximum value as the area to which the target IP address is located. At this time, the area in which the positioning terminal is located may be determined flexibly according to a precision requirement for the area to which the IP address belongs. A city level, a district or county level, or even a street level area in which the position is located is determined specifically according to the position of the positioning terminal and an electronic map database, to satisfy the precision requirement.

Finally, after obtaining the area in which the target IP address is located, the processing module 3 may further record or update the area in which the target IP address area, so as to execute another application such as accurate message pushing subsequently.

In this embodiment of the present application, a geographical area in which an IP address is located can be determined according to a user account using the IP address, and a position of a positioning terminal used when the user account logs in, and because the position of the positioning terminal may correspond to a city level, a district or county level, or a street level area, or the like, the area to which the IP address belongs may be obtained according to a precision requirement of a user, to satisfy a precision requirement of positioning an IP address, thereby facilitating, according to the IP address, when an application such as message pushing is executed subsequently, pushing more precise information about a geographical area in which the user is located for the user.

Figure 6:
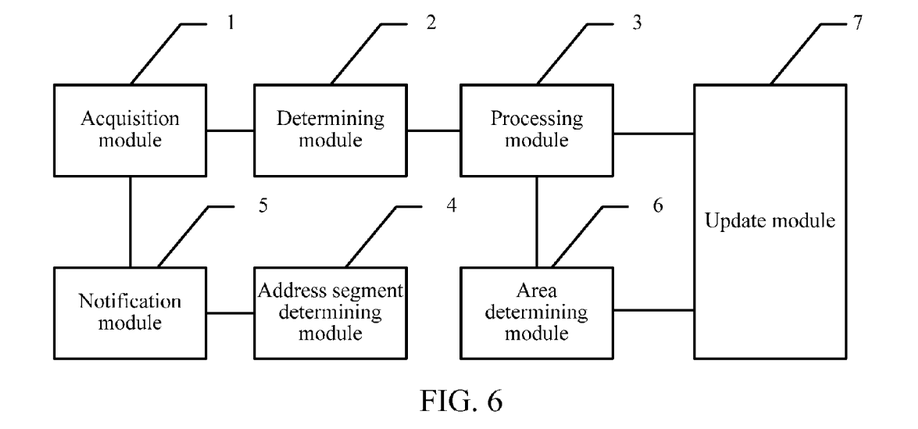
FIG. 6 is a schematic structural diagram of another computer system for determining a geographical area in which an IP address is located of an embodiment of the present application.

FIG. 6 is a schematic structural diagram of another computer system for determining a geographical area in which an IP address is located of an embodiment of the present application. The computer system described in this embodiment of the present application may be disposed in a server configured to record a geographical area in which an IP address is located, so that a more precise IP address or a geographical area to which a corresponding IP address segment belongs can be determined when needed, to execute another application. The computer system includes the acquisition module 1, the determining module 2, and the processing module 3 in the corresponding embodiment of FIG. 5, and further, the computer system of this embodiment of the present application may further include an address segment determining module 4, a notification module 5, and a geographical area determining module.

The address segment determining module 4 is configured to perform a modulo operation on the target IP address according to a preset modulus value, to obtain a target IP address segment.

The notification module 5 is configured to use each IP address in the target IP address segment as a new target IP address to obtain a geographical area in which the new target IP address is located, that is, to notify the acquisition module 1, so that the acquisition module 1, the determining module 2, and the processing module 3 obtain the area in which each IP address in the target IP address segment is located.

The geographical area determining module is configured to determine, according to the geographical area in which each IP address in the target IP address segment is located, a geographical area to which the target IP address segment belongs.

The address segment determining module 4 may perform a modulo 256 operation on the target IP address, to obtain the target IP address segment corresponding to the target IP address, and therefore, there are 256 IP addresses in the target IP address segment.

During a process of determining the target IP address segment, the area determining module 6 may roughly obtain, according to a frequency in which the area corresponding to each IP address in the target IP address segment appears, the area in which the target IP address segment is located.

Alternatively, the area determining module 6 may further calculate a proportion you of covered users and a proportion poi of IP addresses in the areas according to the area in which each IP address in the target IP address segment is located, so as to determine the area in which the target IP address segment is located. Poi=a quantity of IP addresses covered in the corresponding area/256, and pou=a quantity of login accounts of the IP addresses covered in the corresponding area/a total quantity of login accounts of the target IP address segment. Then, a degree of polymerization of the target IP address segment=(poi+pou)/2 is calculated, information about a geographical area having a highest degree of polymerization is the area in which the target IP address segment is finally located. Poi, pou, and the degree of polymerization may be calculated according to the calculation manner in the corresponding embodiment of FIG. 2.

Figure 7:
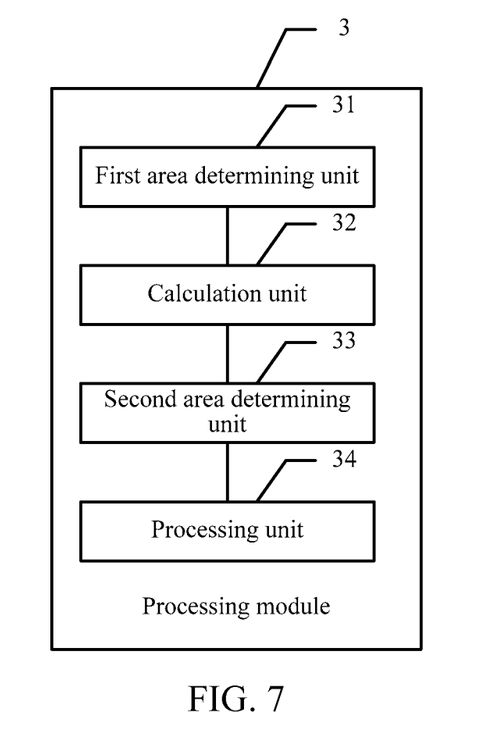
FIG. 7 is a schematic diagram of a specific structure of a processing module in FIG. 6.

Further referring to FIG. 7, the processing module 3 may specifically include a first area determining unit 31, a calculation unit 32, a second area determining unit 33, and a processing unit 34.

The first area determining unit 31 is configured to determine, according to the determined position of each positioning terminal and an electronic map database, a geographical area in which the positioning terminal is located.

The calculation unit 32 is configured to acquire a probability of a terminal being within the geographical area in which a respective positioning terminal is located when the terminal logs into an account in the account set using the target IP address.

The second area determining unit 33 is configured to, for each account in the account set, determine a geographical area corresponding to the position of a positioning terminal associated with a maximum probability as an initial graphical area of the account using the target IP address.

The processing unit 34 is configured to determine an appearance frequency of the initial graphical area of each account using the target IP address, and choose an initial geographical area of an account that has the highest appearance frequency as the geographical area in which the target IP address is located.

The first area determining unit 31 determines, according to the electronic map database, a position in which latitude and longitude coordinates, a coordinate track, and the like of a positioning terminal such as a mobile terminal are located, to obtain a district or county level administrative area, a street level administrative area, or the like in which a login terminal corresponding to each account is located.

Because the mobile terminal is movable, a geographical area in which the mobile terminal area is located may be not a geographical area in which a personal computer allocated with the target IP address is located. At this time, the calculation unit 32 may calculate, based on Bayes' rule, a probability that when each account in the account set logs in, the area in which the terminal using the target IP address is located is the same as the area in which the mobile terminal area is located. A greater probability value indicates a greater probability that the personal computer allocated with the target IP address and the mobile terminal have the same position, and the second area determining unit 33 may use a position, corresponding to a greatest probability value, of the mobile terminal as the position of the personal computer allocated with the target IP address, so that the processing unit 34 determines the area in which the target IP address is located.

Further, optionally, the foregoing calculation unit 32 may specifically include:

a time duration acquisition subunit, configured to determine a time duration of the positioning terminal corresponding to the account is in the geographical area; and acquire a login time duration of the account at the application server using the positioning terminal and a login time duration of the account at the application server using the terminal and the target IP address; and a probability calculation subunit, configured to calculate the probability of the terminal being within the geographical area in which the positioning terminal is located when the terminal logs into an account in the account set using the target IP address according to the time duration of the positioning terminal corresponding to the account is in the geographical area, the login time duration of the account at the application server using the positioning terminal and the login time duration of the account at the application server using the terminal and the target IP address based on Bayes' rule.

For a specific calculation process of the calculation unit 32, reference may be made to the calculation manner described in S402 in the corresponding embodiment of FIG. 2, and details are not described herein.

Referring to FIG. 6 again, the computer system of this embodiment of the present application may further include:

an update module 7, configured to update an IP address library according to the geographical area in which the target IP address is located and the geographical area to which the target IP address segment belongs, so as to determine a position of an IP address according to the updated IP address library.

In this embodiment of the present application, according to a user account using an IP address, and a position of a positioning terminal used when the user account logs in, a geographical area in which an IP address is located can be determined and a geographical area to which an IP address segment corresponding to the IP address belongs may also be obtained. Because the position of the positioning terminal may correspond to a city level, a district or county level, or a street level area, or the like, the area to which the IP address belongs may be obtained according to a precision requirement of a user, to satisfy a precision requirement of positioning an IP address, thereby facilitating, according to the IP address, when an application such as message pushing is executed subsequently, pushing more precise information about a geographical area in which the user is located for the user.

A person of ordinary skill in the art may understand that all or some of the procedures in the methods that implement the foregoing embodiments may be implemented by a plurality of computer program modules instructing relevant hardware. The program modules may be stored in a non-transitory computer readable storage medium and executed by a computer system having one or more processors. When the program modules run, the procedures of the method embodiment are performed. The storage medium may be: a magnetic disk, an optical disc, a read-only memory (ROM), a random access memory (RAM), or the like.

The foregoing disclosure is merely preferred embodiments of the present application, and certainly is not intended to limit the protection scope of the present application. Therefore, equivalent modifications made in accordance with the claims of the present application shall fall within the scope of the present application.

What is claimed is:

1. A method for determining a geographical area in which a target IP address is located, comprising:

at a computer having one or more processors, memory and a plurality of program modules stored in the memory and to be executed by the one or more processors:

acquiring, over a predetermined time period, an account set of accounts of an application server, wherein, during the predetermined time period:

each account in the account set is associated with the target IP address; and the account set is logged into using a plurality of positioning terminals using the target IP address;

for each account in the account set:

determining a position of a respective positioning terminal corresponding to the account during the predetermined time period;

determining a geographical area in which the respective positioning terminal is located based on its determined position and an electronic map database; and determining a respective probability that a computer terminal is within the geographical area in which the respective positioning terminal is located when the computer terminal logs into the account using the target IP address based on an appearance frequency of the respective positioning terminal within the geographical area during the predetermined time period, wherein the computer terminal is distinct from the plurality of positioning terminals;

identifying, among the plurality of positioning terminals, a first positioning terminal that has the highest determined probability; and determining a geographical area corresponding to the position of the first positioning terminal as the geographical area in which the target IP address is located.

2. The method according to claim 1, wherein the step of determining the respective probability that the computer terminal is within the geographical area in which the respective positioning terminal is located when the computer terminal logs into the account using the target IP address further comprises:

determining a time duration of the positioning terminal corresponding to the account is in the geographical area;

acquiring a login time duration of the account at the application server using the positioning terminal and a login time duration of the account at the application server using the computer terminal and the target IP address; and calculating the probability of the computer terminal being within the geographical area in which the positioning terminal is located when the computer terminal logs into an account in the account set using the target IP address according to the time duration of the positioning terminal corresponding to the account is in the geographical area, the login time duration of the account at the application server using the positioning terminal and the login time duration of the account at the application server using the computer terminal and the target IP address based on Bayes' rule.

3. The method according to claim 1, wherein the step of determining the position of the respective positioning terminal corresponding to each account in the account set further comprises:

acquiring, from the application server, the position of the positioning terminal corresponding to each account in the account set, wherein the application server records the position of the positioning terminal after it logs into the corresponding account.

4. The method according to claim 3, further comprising:
performing a modulo operation on the target IP address according to a preset modulus value, to obtain a target IP address segment;

using each IP address in the target IP address segment as a new target IP address to obtain a geographical area in which the new target IP address is located; and determining, according to the geographical area in which each IP address in the target IP address segment is located, a geographical area to which the target IP address segment belongs.

5. The method according to claim 4, further comprising:
updating an IP address library according to the geographical area in which the target IP address is located and the geographical area to which the target IP address segment belongs.

6. A computer system for determining a geographical area in which a target IP address is located, the computer system comprising:

one or more processors;
memory; and
a plurality of program modules stored in the memory and to be executed by the one or more processors, wherein the plurality of program modules further include:

an acquisition module, configured to acquire, over a predetermined time period, an account set of accounts of an application server, wherein, during the predetermined time period:

each account in the account set is associated with the target IP address; and the account set is logged into using a plurality of positioning terminals using the target IP address;

a determining module, configured to, for each account in the account set:

determine a position of a respective positioning terminal corresponding to the account set during the predetermined time period; and determine a geographical area in which the respective positioning terminal is located based on its determined position and an electronic map database; and a processing module, configured to:

determine a respective probability that a computer terminal is within the geographical area in which the respective positioning terminal is located when the computer terminal logs into the account using the target IP address based on an appearance frequency of the respective positioning terminal within the geographical area during the predetermined time period, wherein the computer terminal is distinct from the plurality of positioning terminals;

identify, among the plurality of positioning terminals, a first positioning terminal that has the highest determined probability; and determine a geographical area corresponding to the position of the first positioning terminal as the geographical area in which the target IP address is located.

7. The computer system according to claim 6, wherein the processing module further comprises:

a time duration acquisition subunit, configured to determine a time duration of the positioning terminal corresponding to the account is in the geographical area; and acquire a login time duration of the account at the application server using the positioning terminal and a login time duration of the account at the application server using the computer terminal and the target IP address; and a probability calculation subunit, configured to calculate the probability of the computer terminal being within the geographical area in which the positioning terminal is located when the computer terminal logs into an account in the account set using the target IP address according to the time duration of the positioning terminal corresponding to the account is in the geographical area, the login time duration of the account at the application server using the positioning terminal and the login time duration of the account at the application server using the computer terminal and the target IP address based on Bayes' rule.

8. The computer system according to claim 6, wherein the determining module is configured to acquire, from the application server, the position of the positioning terminal corresponding to each account in the account set, wherein the application server records the position of the positioning terminal after it logs into the corresponding account.

9. The computer system according to claim 8, wherein the plurality of program modules further include:
an address segment determining module, configured to perform a modulo operation on the target IP address according to a preset modulus value, to obtain a target IP address segment;
a notification module, configured to use each IP address in the target IP address segment as a new target IP address to obtain a geographical area in which the new target IP address is located; and
a geographical area determining module, configured to determine, according to the geographical area in which each IP address in the target IP address segment is located, a geographical area to which the target IP address segment belongs.

10. The computer system according to claim 9, wherein the plurality of program modules further include:
an update module, configured to update an IP address library according to the geographical area in which the target IP address is located and the geographical area to which the target IP address segment belongs.

11. A non-transitory computer readable storage medium storing a plurality of computer executable instructions, including instructions for determining a geographical area in which a target IP address is located, which, when executed by a computer system having one or more processors, cause the one or more processors to perform the following steps:
acquiring, over a predetermined time period, an account set of accounts of an application server wherein, during the predetermined time period:
each account in the account set is associated with the target IP address; and
the account set is logged into using a plurality of positioning terminals using the target IP address;
for each account in the account set:
determining a position of a respective positioning terminal corresponding to the account during the predetermined time period;
determining a geographical area in which the respective positioning terminal is located based on its determined position and an electronic map database; and
determining a respective probability that a computer terminal is within the geographical area in which the respective positioning terminal is located when the computer terminal logs into the account using the target IP address based on an appearance frequency of the respective positioning terminal within the geographical area during the predetermined time period, wherein the computer terminal is distinct from the plurality of positioning terminals;
identifying, among the plurality of positioning terminals, a first positioning terminal that has the highest determined probability; and
determining a geographical area corresponding to the position of the first positioning terminal as the geographical area in which the target IP address is located.

12. The non-transitory computer readable storage medium according to claim 11, wherein the instructions for determining the respective probability that the computer terminal is within the geographical area in which the respective positioning terminal is located when the computer terminal logs into the account using the target IP address further comprise:
determining a time duration of the positioning terminal corresponding to the account is in the geographical area;
acquiring a login time duration of the account at the application server using the positioning terminal and a login time duration of the account at the application server using the computer terminal and the target IP address; and
calculating the probability of the computer terminal being within the geographical area in which the positioning terminal is located when the computer terminal logs into an account in the account set using the target IP address according to the time duration of the positioning terminal corresponding to the account is in the geographical area, the login time duration of the account at the application server using the positioning terminal and the login time duration of the account at the application server using the terminal and the target IP address based on Bayes' rule.

13. The non-transitory computer readable storage medium according to claim 11, wherein the instructions for determining the position of the respective positioning terminal corresponding to each account in the account set further comprise:
acquiring, from the application server, the position of the positioning terminal corresponding to each account in the account set, wherein the application server records the position of the positioning terminal after it logs into the corresponding account.

14. The non-transitory computer readable storage medium according to claim 13, further comprising instructions for:
performing a modulo operation on the target IP address according to a preset modulus value, to obtain a target IP address segment;
using each IP address in the target IP address segment as a new target IP address to obtain a geographical area in which the new target IP address is located; and
determining, according to the geographical area in which each IP address in the target IP address segment is located, a geographical area to which the target IP address segment belongs.

15. The non-transitory computer readable storage medium according to claim 14, further comprising instructions for:
updating an IP address library according to the geographical area in which the target IP address is located and the geographical area to which the target IP address segment belongs.

* * * * *